US 8,812,038 B2

(12) United States Patent
Sang et al.

(10) Patent No.: US 8,812,038 B2
(45) Date of Patent: Aug. 19, 2014

(54) ANTI-INTERFERENCE METHOD AND DEVICE IN COMMON-FREQUENCY NETWORKING MOBILE COMMUNICATION SYSTEM

(75) Inventors: Dongsheng Sang, Beijing (CN); Yuemin Cai, Beijing (CN); Hongyan Xu, Beijing (CN); Shaoli Kang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 282 days.

(21) Appl. No.: 13/384,150

(22) PCT Filed: Jul. 15, 2010

(86) PCT No.: PCT/CN2010/075174
§ 371 (c)(1),
(2), (4) Date: Jan. 13, 2012

(87) PCT Pub. No.: WO2011/006438
PCT Pub. Date: Jan. 20, 2011

(65) Prior Publication Data
US 2012/0122504 A1 May 17, 2012

(30) Foreign Application Priority Data
Jul. 15, 2009 (CN) .......................... 2009 1 0088988

(51) Int. Cl.
| H04W 24/10 | (2009.01) |
| H04B 15/00 | (2006.01) |
| H04B 7/26 | (2006.01) |
| H04J 11/00 | (2006.01) |
| H04W 28/04 | (2009.01) |

(52) U.S. Cl.
CPC ............ *H04W 24/10* (2013.01); *H04W 28/048* (2013.01); *H04J 11/005* (2013.01)
USPC ........................................................ 455/501

(58) Field of Classification Search
CPC ....... H04Q 7/00; H04W 16/14; H04W 28/04; H04W 24/00; H04W 24/10; H04W 28/048; H04B 1/525; H04B 1/1027
USPC .......................................................... 455/501
See application file for complete search history.

(56) References Cited

U.S. PATENT DOCUMENTS 8,571,480 B2 * 10/2013 Lee et al. ..................... 455/63.1
8,594,575 B2 * 11/2013 Santoru et al. ............... 455/63.1
(Continued)

FOREIGN PATENT DOCUMENTS

| CN | 1753322 A | 3/2006 |
| CN | 101075834 A | 11/2007 |

(Continued)

OTHER PUBLICATIONS

International Search Report: mailed Nov. 4, 2010; PCT/CN2010/075174.
First Chinese Office Action dated Aug. 14, 2012; Appln. No. 20091008988.0.

*Primary Examiner* — Bobbak Safaipour
(74) *Attorney, Agent, or Firm* — Harness, Dickey & Pierce, P.L.C.

(57) ABSTRACT

The examples of the present invention disclose an anti-interference method and device in a common-frequency networking mobile communication system. The method includes: creating a candidate cell list according to probability that each adjacent cell of a current cell interferes with the current cell; selecting a selected cell list from the candidate cell list according to the probability; performing channel estimation for adjacent cells in the selected cell list, obtaining current signal power of each adjacent cell in the selected cell list according to a channel estimation result, and selecting a detected cell list from the selected cell list according to the signal power; and performing joint detection for adjacent cells in the detected cell list to eliminate interference of the adjacent cells in the detected cell list on the current cell.

19 Claims, 2 Drawing Sheets

(56) References Cited

U.S. PATENT DOCUMENTS

2005/0111408 A1* 5/2005 Skillermark et al. ......... 370/331
2007/0223621 A1* 9/2007 Ahmed ........................ 375/296

FOREIGN PATENT DOCUMENTS

| CN | 101075843 A | 11/2007 |
| WO | 2004/016022 A1 | 2/2004 |

* cited by examiner

ANTI-INTERFERENCE METHOD AND DEVICE IN COMMON-FREQUENCY NETWORKING MOBILE COMMUNICATION SYSTEM

FIELD OF THE INVENTION

The present invention relates to anti-interference technologies in a mobile communication system, and more particularly to an anti-interference method and device in a common-frequency networking mobile communication system.

BACKGROUND OF THE INVENTION

In a common-frequency networking mobile communication system, user signals of common-frequency adjacent cells interfere with user signals of a current cell, so as to decrease communication quality.

At present, a static common-frequency adjacent cell interference list is configured. The interference can be decreased through performing joint detection for cells in the common-frequency adjacent cell interference list, so as to improve communication quality. A specific method may refer to FIG. 1.

FIG. 1 is a flowchart illustrating a conventional method for decreasing interference of common-frequency adjacent cells. As shown in FIG. 1, the method includes the following steps.

Step 101, a common-frequency adjacent cell interference list is configured in a device at network side of a current cell.

The common-frequency adjacent cell interference list may be configured through multiple configuration methods. For example, in a network layout phase, adjacent cells which cause stronger interfere on the current cell are selected from common-frequency adjacent cells according to the maximum user number supported by each adjacent cell, and the selected adjacent cells are added into the common-frequency adjacent cell interference list; or, a Radio Network Controller (RNC) determines user distribution of each cell covered by the RNC, analyzes the interference of each cell on adjacent cells according to the user distribution, selects adjacent cells which cause stronger interfere on the current cell from common-frequency adjacent cells, and adds the selected adjacent cells into the common-frequency adjacent cell interference list configured in the device at the network side of the current cell; or all adjacent cells of the current cell are added into the common-frequency adjacent cell interference list.

After the static common-frequency adjacent cell interference list is configured in step 101, joint detection is performed for cells in the common-frequency adjacent cell interference list through steps 102 and 103, so as to decrease the interference of common-frequency adjacent cells on the current cell.

Step 102, in a mobile communication procedure, interference information of each adjacent cell in the common-frequency adjacent cell interference list is obtained through channel estimation.

In this step, interference code channel information of adjacent cells, i.e., the interference information of the adjacent cells, is obtained according to cell information in the configured common-frequency adjacent cell interference list and channel estimation information.

Step 103, the interference of each adjacent cell on the current cell is eliminated according to the interference information.

As can be seen from the above solution, the common-frequency adjacent cell interference list in the conventional method is a pre-configured static list. However, since the actual interference of each adjacent cell on the current cell changes dynamically, at some time, the static list may not include adjacent cells which cause stronger interference on the current cell.

Since anti-interference processing is performed only for the adjacent cells in the static list, if the adjacent cells which cause stronger interfere on the current cell are not added into the static list, the anti-interference performance of the current cell will be decreased, so as to decrease communication quality.

Every time the interference of an adjacent cell on the current cell is eliminated, channel estimation needs to be performed, and thus excessive configuration of the static list will result in the complexity of the device for performing anti-interference processing at the network side, so as to increase device costs.

SUMMARY OF THE INVENTION

In view of the above, the object of examples of the present invention is to provide an anti-interference method and device in a common-frequency networking mobile communication system, by which the ability that each cell in the mobile communication system decreases the interference of common-frequency adjacent cells can be enhanced, communication quality can be improved, and the complexity of a device for performing anti-interference processing at the network side can be decreased.

In order to achieve the above object, the technical solution provided by the examples of the present invention is implemented as follows.

An anti-interference method in a common-frequency networking mobile communication system includes:

An anti-interference device in a common-frequency networking mobile communication system includes:

As can be seen from the above technical solution, a candidate cell list is created according to the probability that each adjacent cell of the current cell interferes with the current cell, a selected cell list is selected from the candidate cell list according to the probability, channel estimation is performed for adjacent cells in the selected cell list, the current signal power of each adjacent cell in the selected cell list is obtained according to the channel estimation result, a detected cell list is selected from the selected cell list according to the signal power, and joint detection is performed for adjacent cells in the detected cell list to eliminate the interference of the adjacent cells on the current cell.

The detected cell list is created dynamically according to the probability that each adjacent cell interferes with the current cell and the current signal power of the adjacent cells, and usually contains adjacent cells which cause stronger interference on the current cell. Therefore, the present invention can select the adjacent cells which cause stronger interference on the current cell to perform anti-interference processing, so as to enhance the ability that each cell in the mobile communication system decreases the interference of common-frequency adjacent cells, and improve communication quality. In addition, since the number of adjacent cells in the detected cell list is small, the complexity of the device for performing anti-interference processing at the network side is decreased.

DETAILED DESCRIPTION OF THE INVENTION

In order to make the object, technical solution and merits of the present invention clearer, the present invention will be illustrated hereinafter in detail with reference to the accompanying drawings and examples.

Figure 1:
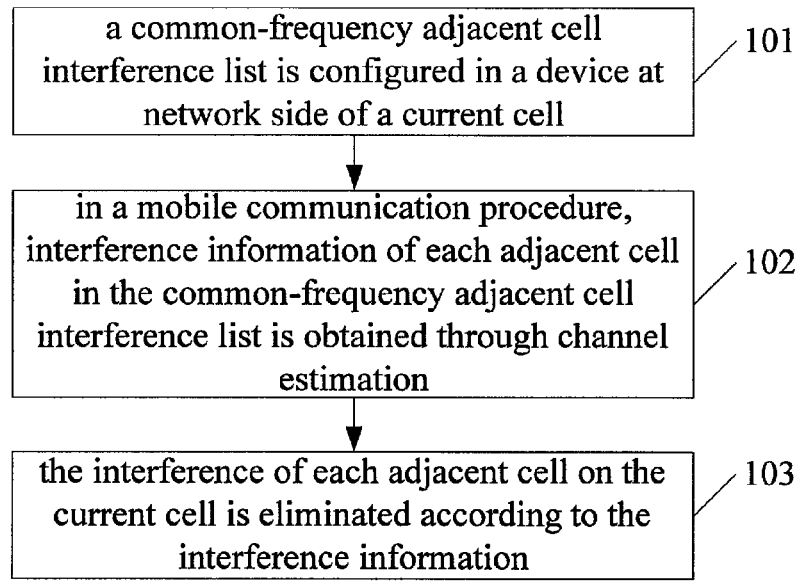
FIG. 1 is a flowchart illustrating a conventional method for decreasing interference of common-frequency adjacent cells.
Figure 2:
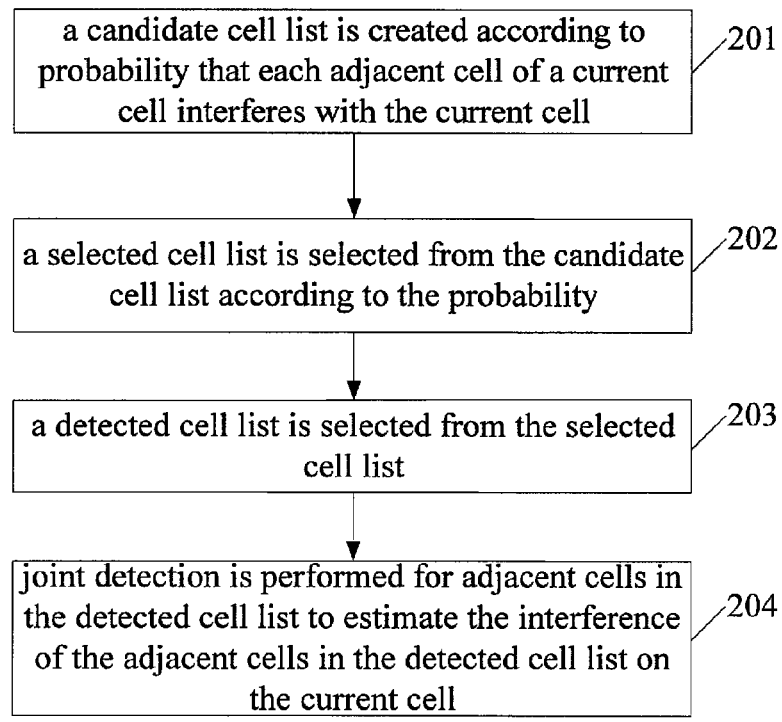
FIG. 2 is a flowchart illustrating a method for decreasing interference of common-frequency adjacent cells according to an example of the present invention.

FIG. 2 is a flowchart illustrating a method for decreasing interference of common-frequency adjacent cells according to an example of the present invention. As shown in FIG. 2, the method includes the following steps.

Step 201, a candidate cell list is created according to probability that each adjacent cell of a current cell interferes with the current cell.

In this step, IDs of adjacent cells to be added into the candidate cell list and initial probability that each adjacent cell interferes with the current cell may be determined in the network layout phase according to such factors as user number which can be supported by each adjacent cell, transmission power of each adjacent cell, physical location relation between each adjacent cell and the current cell, and an antenna direction pattern of each adjacent cell. And then, the candidate cell list and the probability are stored in a device for performing anti-interference processing at the network side. Usually, the device at the network side is a base station.

Generally, the nearer the distance between an adjacent cell and the current cell is, the stronger the interference of the adjacent cell on the current cell is. When the antenna direction pattern of the adjacent cell points to the current cell, the interference of the adjacent cell on the current cell is stronger. And thus, when other factors of multiple adjacent cells, such as the supported user number and the transmission power, are the same, an adjacent cell which is nearer to the current cell and of which the antenna direction pattern points to the current cell may be added into the front location in the candidate cell list. In this way, the location of each adjacent cell in the candidate cell list can indicate the probability that each adjacent cell interferes with the current cell.

In this step, an initial cell list for storing the IDs of all adjacent cells of the current cell may be stored in the device at the network side in advance. The device at the network side also stores initial probability that each adjacent cell in the initial cell list interferes with the current cell. The candidate cell list is selected from the initial cell list according to the probability that each adjacent cell in the initial cell list interferes with the current cell.

The method of determining the initial probability that each adjacent cell in the initial cell list interferes with the current cell is the same as that of determining the initial probability that each adjacent cell in the candidate cell list interferes with the current cell.

The probability that each adjacent cell in the initial cell list interferes with the current cell may be updated periodically.

A probability update period $T_3$ of adjacent cells in the initial cell list is preset. When $T_3$ expires, channel estimation is performed for the adjacent cells in the initial cell list, the current signal power of each adjacent cell in the initial cell list is obtained according to a channel estimation result, and the probability of the adjacent cells in the initial cell list is updated according to the signal power.

In order to increase the probability update speed, a following method for updating the probability of adjacent cells in the initial cell list may be used. When $T_3$ expires, only the probability of residual adjacent cells in the initial cell list except adjacent cells in the candidate cell list is updated. Specifically, channel estimation is performed for the residual adjacent cells, the current signal power of the residual adjacent cells is obtained according to a channel estimation result, and the probability of the residual adjacent cells is updated according to the signal power.

Correspondingly, the candidate cell list may also be updated periodically. When the candidate cell list is updated, an adjacent cell of which probability is smaller in the candidate cell list is replaced with an adjacent cell of which probability is larger in the initial cell list, or an adjacent cell is randomly selected from the adjacent cells in the initial cell list which are not in the candidate cell list currently, and the selected adjacent cell is added into the candidate cell list.

A longer $T_3$ and a longer update period of the candidate cell list may be set, e.g., $T_3$ and the update period are set as one week.

Step 202, a selected cell list is selected from the candidate cell list according to the probability.

Step 203, a detected cell list is selected from the selected cell list.

In this step, channel estimation is performed for adjacent cells in the selected cell list, the current signal power of each adjacent cell in the selected cell list is obtained according to a channel estimation result, and the detected cell list is selected from the selected cell list according to the signal power.

Step 204, joint detection is performed for adjacent cells in the detected cell list to estimate the interference of the adjacent cells in the detected cell list on the current cell.

In steps 202 and 203, the probability of each adjacent cell in the candidate cell list may be updated periodically, and the selected cell list may also be updated periodically according to the most recent probability of each adjacent cell in the candidate cell list.

Specifically, a probability update period $T_1$ of adjacent cells in the candidate cell list and a cell update period $T_2$ of the selected cell list are preset, where $T_2 \geq T_1$.

When $T_1$ expires, the probability of the adjacent cells in the detected cell list is increased by a first probability update value $P_1$, the probability of adjacent cells which are in the selected cell list and are not in the detected cell list subtracted by a second probability update value $P_2$, and the probability of adjacent cells which are in the candidate cell list and are not in the selected cell list is increased by a third probability update value $\Delta$.

When $T_2$ expires, a new selected cell list is reselected from the candidate cell list according to the updated probability of the adjacent cells in the candidate cell list.

For example, adjacent cells may be selected according to a sequence of the updated probability of the adjacent cells in the candidate cell list from big to small, and the adjacent cells in the selected cell list are all replaced with the adjacent cells selected from the candidate cell list. Or, adjacent cells are selected according to a sequence of the updated probability of the adjacent cells in the candidate cell list from big to small, and a part of the adjacent cells in the selected cell list are replaced with the adjacent cells selected from the candidate cell list, where the number of the replaced adjacent cells is not larger than a preset value. The preset value may be configured according to the requirements on the complexity of the device at the network side. Generally, the lower the complexity of the device at the network side is, the smaller the preset value is.

When the new selected cell list is reselected from the candidate cell list according to the updated probability of the adjacent cells in the candidate cell list, if the probability which is obtained by performing probability update for the adjacent cells in the candidate cell list when $T_3$ expires is different from the probability which is obtained by performing probability update for the adjacent cells in the candidate cell list when $T_1$ expires, a new selected cell list is reselected from the candidate cell list according to the probability which is obtained by performing probability update for the adjacent cells in the candidate cell list when $T_1$ expires. That is to say, when being selected from the candidate cell list, the selected cell list is selected according to the probability obtained by performing probability update for the adjacent cells in the candidate cell list. Specifically, a probability table is respectively maintained for the candidate cell list and the initial cell list, and the selected cell list is selected according to the probability table of the candidate cell list.

When the selected cell list is selected from the candidate cell list according to the probability, if the updated probability of multiple adjacent cells in the candidate cell list is the same, it is determined, according to the probability, the physical location relation between the multiple adjacent cells and the current cell, and respective antenna direction patterns of the multiple adjacent cells, whether to add the multiple adjacent cells into the selected cell list. For example, if the number of updated adjacent cells is limited so that only one adjacent cell in the multiple adjacent cells can be added into the selected cell list, an adjacent cell which is arranged in the front location of the candidate cell list according to the physical location relation between the multiple adjacent cells and the current cell and the antenna direction patterns of the multiple adjacent cells is added into the selected cell list.

According to the above method examples, a device for decreasing interference of common-frequency adjacent cells provided by an example of the present invention will be illustrated hereinafter.

Figure 3:
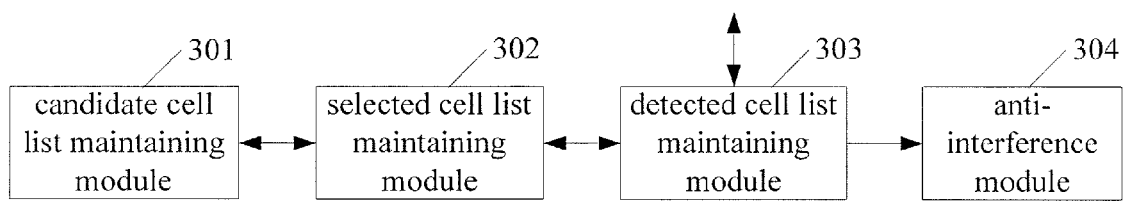
FIG. 3 is a schematic diagram illustrating the structure of a device for decreasing interference of common-frequency adjacent cells according to an example of the present invention.

FIG. 3 is a schematic diagram illustrating the structure of a device for decreasing interference of common-frequency adjacent cells according to an example of the present invention. As shown in FIG. 3, the device includes a candidate cell list maintaining module 301, a selected cell list maintaining module 302, a detected cell list maintaining module 303 and an anti-interference module 304.

The candidate cell list maintaining module 301 is configured to store a candidate cell list which is created according to probability that each adjacent cell of a current cell interferes with the current cell, and probability that each adjacent cell in the candidate cell list interferes with the current cell.

The selected cell list maintaining module 302 is configured to select a selected cell list from the candidate cell list according to the probability that each adjacent cell in the candidate cell list interferes with the current cell and store the selected cell list.

The detected cell list maintaining module 303 is configured to perform channel estimation for adjacent cells in the selected cell list, obtain current signal power of each adjacent cell in the selected cell list according to a channel estimation result, and select a detected cell list from the selected cell list according to the signal power and store the detected cell list.

The anti-interference module 304 is configured to perform joint detection for adjacent cells in the detected cell list to eliminate interference of the adjacent cells in the detected cell list on the current cell.

The device further includes a probability update module.

The probability update module is configured to, when a preset probability update period $T_1$ expires, increase probability of the adjacent cells in the detected cell list by a first probability update value $P_1$, subtract probability of adjacent cells which are in the selected cell list and are not in the detected cell list by a second probability update value $P_2$, and increase probability of adjacent cells which are in the candidate cell list and are not in the selected cell list by a third probability update value $\Delta$.

The selected cell list maintaining module 302 further includes a module configured to, when a cell update period $T_2$ expires, reselect a new selected cell list from the candidate cell list according to the updated probability of the adjacent cells in the candidate cell list, where $T_2 \geq T_1$.

The procedure that the selected cell list maintaining module 302 selects the new selected cell list from the candidate cell list is as follows:

adjacent cells are selected according to a sequence of the updated probability of the adjacent cells in the candidate cell list from big to small, and all or part of the adjacent cells in the selected cell list are replaced with the adjacent cells selected from the candidate cell list.

The device may further include an initial cell list maintaining module.

The initial cell list maintaining module is configured to store an initial cell list containing IDs of all adjacent cells of the current cell, and store probability that each adjacent cell in the initial cell list interferes with the current cell.

The candidate cell list maintaining module 301 further includes a module configured to select the candidate cell list from the initial cell list according to the probability that each adjacent cell in the initial cell list interferes with the current cell.

The candidate cell list maintaining module 301 may further include a module configured to, when a probability update period $T_3$ of the adjacent cells in the initial cell list expires, perform channel estimation for residual adjacent cells in the initial cell list except the adjacent cells in the candidate cell list, obtain current signal power of the residual adjacent cells according to a channel estimation result, and update the probability of the residual adjacent cells according to the signal power.

The candidate cell list maintaining module 301 may further include a module configured to, when the candidate cell list is updated, select an adjacent cell from adjacent cells which are in the initial cell list and are not in the candidate cell list currently, and add the selected adjacent cell into the candidate cell list. The candidate cell list maintaining module 301 may randomly select an adjacent cell from the adjacent cells which are in the initial cell list and are not in the candidate cell list currently and add the selected adjacent cell into the candidate cell list, or select an adjacent cell according to a preset rule and add the selected adjacent cell into the candidate cell list, e.g., select an adjacent cell according to the physical location of the adjacent cell, an antenna direction pattern of the adjacent cell and/or the probability that the adjacent cell interferes with the current cell, and add the selected adjacent cell into the candidate cell list.

The selected cell list maintaining module 302 may further include a module configured to, if probability of multiple adjacent cells in the candidate cell list is the same, determine, according to the probability of the multiple adjacent cells, the physical location relation between the multiple adjacent cells and the current cell, and respective antenna direction patterns of the multiple adjacent cells, whether to add the multiple adjacent cells into the selected cell list.

The foregoing is only the preferred examples of the present invention and is not used to limit the protection scope of the present invention. Any modification, equivalent substitution and improvement without departing from the spirit and principle of the present invention are within the protection scope of the present invention.

What is claimed is:

1. An anti-interference method in a common-frequency networking mobile communication system, comprising:
creating, by a device at a network side, a candidate cell list according to probability that each adjacent cell of a current cell interferes with the current cell, and storing the candidate cell list and probability that each adjacent cell in the candidate cell list interferes with the current cell;
selecting, by the device at the network side, a selected cell list from the candidate cell list according to the probability that each adjacent cell in the candidate cell list interferes with the current cell, and storing the selected cell list;
performing, by the device at the network side, channel estimation for adjacent cells in the selected cell list, obtaining current signal power of each adjacent cell in the selected cell list according to a channel estimation result, selecting a detected cell list from the selected cell list according to the signal power, and storing the detected cell list; and
performing, by the device at the network side, joint detection for adjacent cells in the detected cell list to eliminate interference of the adjacent cells in the detected cell list on the current cell.

2. The method of claim 1, further comprising:
presetting, by the device at the network side, a probability update period $T_1$ of adjacent cells in the candidate cell list and a cell update period $T_2$ of the selected cell list, wherein $T_2 \geq T_1$;
when $T_1$ expires, increasing, by the device at the network side, probability of adjacent cells in the detected cell list by a first probability update value $P_1$, subtracting probability of adjacent cells which are in the selected cell list and are not in the detected cell list by a second probability update value $P_2$, and increasing probability of adjacent cells which are in the candidate cell list and are not in the selected cell list by a third probability update value $\Delta$; and
when $T_2$ expires, reselecting, by the device at the network side, a new selected cell list from the candidate cell list according to the updated probability of adjacent cells in the candidate cell list.

3. The method of claim 2, wherein reselecting, by the device at the network side, the new selected cell list from the candidate cell list comprises:
selecting adjacent cells according to a sequence of the updated probability of the adjacent cells in the candidate cell list from big to small, and replacing all the adjacent cells in the selected cell list with the adjacent cells selected from the candidate cell list.

4. The method of claim 2, wherein reselecting, by the device at the network side, the new selected cell list from the candidate cell list comprises:
selecting adjacent cells according to a sequence of the updated probability of the adjacent cells in the candidate cell list from big to small, and replacing a part of the adjacent cells in the selected cell list with the adjacent cells selected from the candidate cell list, where the number of the replaced adjacent cells is not larger than a preset value.

5. The method of claim 1, wherein creating, by the device at the network side, the candidate cell list according to the probability that each adjacent cell of the current cell interferes with the current cell comprises:
storing IDs of all adjacent cells of the current cell and probability that each adjacent cell in an initial cell list interferes with the current cell in the initial cell list, and selecting the candidate cell list from the initial cell list according to the probability that each adjacent cell in the initial cell list interferes with the current cell.

6. The method of claim 5, further comprising:
presetting, by the device at the network side, a probability update period $T_3$ of adjacent cells in the initial cell list, and when $T_3$ expires, updating probability of residual adjacent cells in the initial cell list except the adjacent cells in the candidate cell list.

7. The method of claim 6, wherein updating the probability of residual adjacent cells in the initial cell list except the adjacent cells in the candidate cell list comprises:
performing, by the device at the network side, channel estimation for the residual adjacent cells, obtaining current signal power of the residual adjacent cells according to a channel estimation result, and updating the probability of the residual adjacent cells according to the signal power.

8. The method of claim 5, after selecting the candidate cell list from the initial cell list according to the probability that each adjacent cell in the initial cell list interferes with the current cell, further comprising:
when the candidate cell list is updated, selecting, by the device at the network side, an adjacent cell from adjacent cells which are in the initial cell list and are not in the candidate cell list currently, and adding the selected adjacent cell into the candidate cell list.

9. The method of claim 1, wherein selecting the selected cell list from the candidate cell list according to the probability that each adjacent cell in the candidate cell list interferes with the current cell, and storing the selected cell list comprises:
if probability of multiple adjacent cells in the candidate cell list is the same, determining, by the device at the network side according to the probability, a physical location relation between the multiple adjacent cells and the current cell, and respective antenna direction patterns of the multiple adjacent cells, whether to add the multiple adjacent cells into the selected cell list.

10. An anti-interference device in a common-frequency networking mobile communication system, comprising: a candidate cell list maintaining module, a selected cell list maintaining module, a detected cell list maintaining module and an anti-interference module, wherein
the candidate cell list maintaining module is configured to store a candidate cell list which is created according to probability that each adjacent cell of a current cell interferes with the current cell, and probability that each adjacent cell in the candidate cell list interferes with the current cell;
the selected cell list maintaining module is configured to select a selected cell list from the candidate cell list according to the probability that each adjacent cell in the candidate cell list interferes with the current cell and store the selected cell list;
the detected cell list maintaining module is configured to perform channel estimation for adjacent cells in the selected cell list, obtain current signal power of each adjacent cell in the selected cell list according to a channel estimation result, and select a detected cell list from the selected cell list according to the signal power and store the detected cell list; and the anti-interference module is configured to perform joint detection for adjacent cells in the detected cell list to eliminate interference of the adjacent cells in the detected cell list on the current cell.

11. The device of claim 10, further comprising a probability update module;
the probability update module is configured to, when a preset probability update period $T_1$ expires, increase probability of the adjacent cells in the detected cell list by a first probability update value $P_1$, subtract probability of adjacent cells which are in the selected cell list and are not in the detected cell list by a second probability update value $P_2$, and increase probability of adjacent cells which are in the candidate cell list and are not in the selected cell list by a third probability update value $\Delta$; and
the selected cell list maintaining module further comprises a module configured to, when a cell update period $T_2$ expires, reselect a new selected cell list from the candidate cell list according to the updated probability of the adjacent cells in the candidate cell list, wherein $T_2 \geq T_1$.

12. The device of claim 11, wherein
the selected cell list maintaining module is configured to select adjacent cells according to a sequence of the updated probability of the adjacent cells in the candidate cell list from big to small, and replace all or part of the adjacent cells in the selected cell list with the adjacent cells selected from the candidate cell list.

13. The device of claim 10, further comprising an initial cell list maintaining module, wherein
the initial cell list maintaining module is configured to store an initial cell list containing IDs of all adjacent cells of the current cell, and store probability that each adjacent cell in the initial cell list interferes with the current cell; and
the candidate cell list maintaining module further comprises a module configured to select the candidate cell list from the initial cell list according to the probability that each adjacent cell in the initial cell list interferes with the current cell.

14. The device of claim 13, wherein the candidate cell list maintaining module further comprises a module configured to, when a probability update period $T_3$ of the adjacent cells in the initial cell list expires, perform channel estimation for residual adjacent cells in the initial cell list except the adjacent cells in the candidate cell list, obtain current signal power of the residual adjacent cells according to a channel estimation result, and update the probability of the residual adjacent cells according to the signal power.

15. The device of claim 13, wherein the candidate cell list maintaining module further comprises a module configured to, when the candidate cell list is updated, select an adjacent cell from adjacent cells which are in the initial cell list and are not in the candidate cell list currently, and add the selected adjacent cell into the candidate cell list.

16. The device of claim 10, wherein the selected cell list maintaining module further comprises a module configured to, if probability of multiple adjacent cells in the candidate cell list is the same, determine, according to the probability of the multiple adjacent cells, physical location relation between the multiple adjacent cells and the current cell, and respective antenna direction patterns of the multiple adjacent cells, whether to add the multiple adjacent cells into the selected cell list.

17. The method of claim 2, wherein creating the candidate cell list according to the probability that each adjacent cell of the current cell interferes with the current cell comprises:
storing, by the device at the network side, IDs of all adjacent cells of the current cell and probability that each adjacent cell in an initial cell list interferes with the current cell in the initial cell list, and selecting the candidate cell list from the initial cell list according to the probability that each adjacent cell in the initial cell list interferes with the current cell.

18. The method of claim 3, wherein creating the candidate cell list according to the probability that each adjacent cell of the current cell interferes with the current cell comprises:
storing, by the device at the network side, IDs of all adjacent cells of the current cell and probability that each adjacent cell in an initial cell list interferes with the current cell in the initial cell list, and selecting the candidate cell list from the initial cell list according to the probability that each adjacent cell in the initial cell list interferes with the current cell.

19. The method of claim 4, wherein creating the candidate cell list according to the probability that each adjacent cell of the current cell interferes with the current cell comprises:
storing, by the device at the network side, IDs of all adjacent cells of the current cell and probability that each adjacent cell in an initial cell list interferes with the current cell in the initial cell list, and selecting the candidate cell list from the initial cell list according to the probability that each adjacent cell in the initial cell list interferes with the current cell.

* * * * *